United States Patent
El-Gazzar et al.

(10) Patent No.: US 7,154,625 B2
(45) Date of Patent: Dec. 26, 2006

(54) HEURISTIC ROUTING OF ELECTRONIC DOCUMENTS

(75) Inventors: Amin El-Gazzar, Key Biscayne, FL (US); Adrian Puente, Miami, FL (US); Hartmut Wolf, Miami Beach, FL (US)

(73) Assignee: Venali, Inc., Coral Gables, FL (US)

( * ) Notice: Subject to any disclaimer, the term of this patent is extended or adjusted under 35 U.S.C. 154(b) by 218 days.

(21) Appl. No.: 10/308,530

(22) Filed: Dec. 3, 2002

(65) Prior Publication Data

US 2004/0105118 A1 Jun. 3, 2004

(51) Int. Cl.
*G06K 15/00* (2006.01)
*G06F 15/00* (2006.01)

(52) U.S. Cl. .................................. 358/1.15; 358/1.1
(58) Field of Classification Search ............... 358/1.1, 358/1.6, 1.13, 1.15, 1.9, 402, 500; 709/200, 709/201, 407; 379/114.02; 370/396, 400
See application file for complete search history.

(56) References Cited

U.S. PATENT DOCUMENTS

| | | | | |
|---|---|---|---|---|
| 5,739,919 | A | | 4/1998 | Lee et al. ................... 358/407 |
| 5,862,203 | A | | 1/1999 | Wulkan et al. ............. 379/114 |
| 6,005,926 | A | * | 12/1999 | Mashinsky ............. 379/114.02 |
| 6,023,470 | A | | 2/2000 | Lee et al. ................... 370/401 |
| 6,144,727 | A | * | 11/2000 | Mashinsky ............. 379/114.02 |
| 6,285,753 | B1 | | 9/2001 | Slusher ........................ 379/355 |
| 6,577,600 | B1 | * | 6/2003 | Bare ........................... 370/238 |
| 6,580,715 | B1 | * | 6/2003 | Bare ........................... 370/396 |
| 6,594,268 | B1 | * | 7/2003 | Aukia et al. ................ 370/400 |
| 2003/0110443 | A1 | * | 6/2003 | Yankovich et al. ...... 715/501.1 |

OTHER PUBLICATIONS

CommWeb.com, *AVT RightFax Wins Fax over IP Shootout*, <http://www.commweb.com/article/CWB20000329S0001> (Oct. 31, 2002).
*Fax Star Least Cost Routing (L:CR) with Fax Star® Assistant, Fax Star® Tips and Tricks*, <http://www.faxstar.com>.
*FAXport—Enhanced IP Fax Services for Enterprises and Workgroups*, <http://www.faxport.com/faxportp.html> (Oct. 31, 2002).
*Universal Information Exchange Family of Products, Captaris RightFax*, (2002).

(Continued)

*Primary Examiner*—Gabriel I. Garcia
(74) *Attorney, Agent, or Firm*—Steven M. Greenberg, Esq.; Carey, Rodriguez, Greenberg & Paul, LLP

(57) ABSTRACT

An optimal call routing system and method based upon pre-configured heuristics. In one aspect of the invention, a heuristic routing method can be provided in which a request to transmit an electronic document to a target destination can be received. A set of statistics associated with the target destination can be retrieved from a data store. A heuristically optimal route can be selected from the set of statistics through which the electronic document can be transmitted to the target destination. Subsequently, the electronic document can be transmitted to the target destination over the selected heuristically optimal route. Finally, statistics relating to the transmission can be collected and stored in the data store.

23 Claims, 3 Drawing Sheets

OTHER PUBLICATIONS

CommWeb.com, *Fax over IP, How Secure is your VPN*, <http://www.commweb.com/article/printableArticle?doc_id=COM20001003S0017> (Oct. 31, 2002).

Venali, Inc., *Venali Solutions*, <http://www.venali.com/solutions/index.asp> (Oct. 31, 2002).

*Fax About IP*, Byte.com, ttp://www.byte.com/art/9801/sec10/art2.htm> (Oct. 31, 2002).

*Pronexus*, ttp://www.pronexus.com/tools/cs_protus.html> (Oct. 31, 2002).

*Infonet IP FAX, infonet® Insight Matters™*, <http://www.infonet.com>.

*REEDFAX® —The Patent Connection®—Internet Ordering System, Reed Technology and Information Sevices, Inc.*, <http://www.reedfax.com/cgi-bin/dbml.exe?TEMPLATE=/reedfax/ord$_{13}$ good.dbm> (Aug. 7, 2002).

eMAIL-to-Fax Gateway, *POPstar Communications, Inc.*, <http://www.pop-star.net>.

*Guide to Internet Faxing*, Killer Fax Server Technology from RightFAX, Inc., 1997, pp. 1-16.

*Guide to Intelligent Least Cost Routing*, Award-Winning Fax Server Technology from RightFAX, Inc., 1997, pp. 1-17.

\* cited by examiner

HEURISTIC ROUTING OF ELECTRONIC DOCUMENTS

BACKGROUND OF THE INVENTION

1. Statement of the Technical Field

The present invention relates to the field of telecommunications and more particularly to the heuristic routing of electronic documents.

2. Description of the Related Art

Traditionally, documents have been exchanged between parties by way of hand delivery, postal service, or facsimile. More recently, the public Internet has become a highly effective medium through which electronic documents have been exchanged, particularly as attachments to electronic mail. Still, in many occasions, the use of electronic mail cannot provide an adequate medium for document transfer. Specifically, where the original copy of a document is in a hard copy format, with handwritten or non-textual elements, a facsimile device can be the preferred tool of document exchange.

Facsimile devices ordinarily exchange facsimile data with other facsimile devices over the public switched telephone network (PSTN). Specifically, as in the case of an ordinary telephone call, the calling facsimile device can establish a communicative link over the PSTN to a receiving facsimile device. Each of the devices can negotiate suitable data exchange protocols and the transfer of facsimile data can commence. Upon completion of the exchange, the received facsimile data can be transposed to hard copy form and the call can terminate. Notably, like the telephone call, connection charges can apply for the duration of the facsimile communicative link in the same way charges can accrue for a voice call between the same two locations. Where these locations are distance apart, long distance charges may apply.

To circumvent the costs associated with the conventional exchanged of a document between facsimile devices, several technologies have been developed with which facsimile data can be exchanged between facsimile devices not over the PSTN, but over the public Internet. Referred to in the art as "IP faxing", facsimile data can be packetized and forwarded across the Internet to a network node local to the facsimile recipient. In this way, toll charges ordinarily associated with PSTN based facsimile communications and ordinary telephone calls can be avoided. Consequently, IP faxing has proven to be the bane of fax intensive business processes, such as direct marketing and broadcast faxing.

Broadcast faxing, whether IP faxing or otherwise, can be an inexact science. Specifically, at best the broadcast facsimile device can be provided only with an electronic or hard copy of a facsimile document and a list of target facsimile numbers. The validation of the numbers in the list, however, remains unaccounted for, both with respect to a proper correspondence between facsimile number and target recipient, and also with respect to the technical reliability of the underlying infrastructure required to establish a communicative link between the fax server and the target facsimile device.

For example, when attempting to transmit a facsimile to a target facsimile device at a specified telephone number, it may be the case that the specified telephone number does not in fact correspond to a facsimile device. In this case, the facsimile will not be transmitted to the target facsimile device and, in all likelihood, the actual party associated with the mis-specified telephone number will become displeased with the periodic attempts of the fax server to deliver the facsimile to the non-existent facsimile device. Mis-specified telephone numbers do not form the basis of all failures to deliver a facsimile to its intended recipient. Rather, oftentimes the underlying technology can form the basis of an inefficiently delivered facsimile.

In particular, recalling that telephone charges accrue in many cases by the minute or by the fraction of a minute, an unreliable communicatively link over the PSTN can result in the expensive process of error correction. To ensure that a facsimile is delivered over the communicative link in an error-free fashion, in many cases, an error-prone connection will require several reattempts to retransmit data which had not been successfully transmitted in the first place. Of course, the strength of error correction can be linked directly to the processing power of the transmitting and receiving facsimile devices. Accordingly, it would be preferable to establish the most reliable communicative link possible in order to minimize the retransmission of data in the course of delivering a facsimile to a target device.

One skilled in the art will recognize the importance of transmission cost in the broadcast fax and electronic document delivery market. To that end, recent renditions of broadcast IP faxing technology include least cost routing (LCR) functionality. LCR refers to the logic of a fax server in determining the lowest cost delivery method for a given facsimile—by calling the destination facsimile device directly, or by sending the facsimile to a remote fax server over the Internet which can call the destination facsimile device. Still, LCR alone cannot accommodate either mis-specified telephone numbers, or faults in the underlying communications medium. Moreover, the fundamental intent of LCR is to reduce costs, regardless of the effectiveness of the chosen method.

U.S. Pat. No. 5,862,203 issued on Jan. 19, 1999 to Wulkan et al. for TELECOMMUNICATIONS CALL MANAGEMENT SYSTEM relates to an LCR system for choosing the optimum telecommunications carrier for telephone calls made by a user. In that regard, it will be clear to one skilled in the general art of telecommunications call routing that not all carriers in a PSTN provide the same connectivity at the same cost. Rather, the Wulkan specification teaches that some carriers provide the same connectivity, albeit at different costs. Based upon this realization, the system disclosed in the Wulkan specification teaches the selection of a particular carrier to carry a telephone call based upon a set of parameters, all relating to the cost of carrying a particular phone call to its destination.

Importantly, most of the parameters in Wulkan which are selected for consideration when optimally routing a telephone call relate to the originator of the call rather than the destination. For example, the parameters include the eligibility of the caller for a volume discount, call history discounts, and the typical call duration based upon a statistical distribution for the caller. None of the parameters, however, relate to the called party. More importantly, Wulkan fails to adequately account for the disparate line quality provided by each different carrier.

More particularly, column 15, line 51 through column 16, line 14 of the Wulkan specification teaches a "performance monitor" with which the quality of a telephone connection can be measured. Based upon this measurement, the carrier associated with the connection can be bypassed in future calls where it is determined that the carrier cannot provide a good connection. Still, according to column 15, lines 60–63 state quite explicitly that voice quality of a telephone call is measured subjectively by a caller who can key in a code for a "BAD" call. Based only upon the caller's determination that a particular carrier provides poor voice quality, the carrier can be bypassed for a second, most optimal carrier.

Notably, certain call performance data can be collected without user intervention in the Wulkan system. Specifically, as recited in column 16, lines 1–4, automatically acquired performance data includes calls which have not been established due to lack of a ring tone or a busy tone, congestion tone, or short call duration. Thus, the Wulkan system can only provide for a low-tech analysis of voice quality, as a result, Wulkan cannot adequately compare in an objective, repeatable manner line quality from carrier to carrier. Rather, in Wulkan, a carrier is either acceptable or "bad". Accordingly, one seeking to solve the problem of LCR in relation to optimizing the delivery of an electronic document through a selected carrier over the PSTN or an IP network would not turn to the deficient teachings of Wulkan.

Unlike Wulkan, U.S. Pat. No. 6,285,753 issued on Sep. 4, 2001 to Slusher for SYSTEM AND METHOD FOR LOCALLY INTELLIGENT AND ADAPTIVE DIALING OF TELEPHONE AND OTHER NETWORK ACCESS NUMBERS relates to the stochastic determination that a telephone number has been misdialed. Particularly, in the Slusher system, statistics are compiled that reflect the likelihood that a dialed network access code is invalid. Based upon the compiled statistics, the Slusher system can predict when a dialer has erred in providing the code. Thus, while Slusher stands for the proposition that predictive dialing can be applied to pre-empt a misdialed phone number, Slusher fails to address the crux of the problem—call routing for a specified target recipient of an electronic document across carriers having disparate levels of connection quality.

Notably, the teachings of U.S. Pat. No. 6,023,470 issued on Feb. 8, 2000 to Lee et al. for POINT OF PRESENCE (POP) FOR DIGITAL FACSIMILE NETWORK WITH VIRTUAL POPS USED TO COMMUNICATE WITH OTHER NETWORKS relates directly to IP faxing technology. As it will be recognized by the skilled artisan, some routing logic disclosed in Lee addresses the occasional failed attempt to deliver a fax to a recipient where the destination facsimile device cannot be accessed because the line is busy, out-of-service, or because a human voice answers the phone. In remediation of the failed attempt, the sender can be notified so that the sender can reattempt transmission at a later time rather than repeatedly dialing the number of the recipient.

Notwithstanding the foregoing references to the prior art, one skilled in the art will recognize several deficiencies inherent to conventional LCR technology. First, conventional LCR technology fails to account for varying levels of quality among different carriers when applying LCR logic to a specific attempt to transmit a document. Rather, LCR remains primarily focused upon cost savings. The same can be said of non-PSTN, IP devices such as routers, terminals, and the like which may have associated therewith vary degrees of transmission latency, traffic, and IP transport parameters. Second, conventional LCR technology fails to apply a probabilistic analysis to LCR logic based upon accumulated connection statistics. Accordingly, because LCR remains primarily focused upon cost efficiencies without considerable regard to effective communicative links, conventional LCR technology cannot provide optimal routing of an electronic document.

SUMMARY OF THE INVENTION

The present invention is an optimal call routing system and method based upon pre-configured heuristics which addresses the foregoing recited deficiencies of conventional LCR logic and provides a novel and non-obvious system and method for heuristically routing an electronic document to a target recipient devices based upon a statistical analysis of connection quality associated with the target recipient devices and the costs incurred in establishing a similar connection. Specifically, in one aspect of the invention, a heuristic routing method can be provided in which a request to transmit one or more electronic document pages to a target destination can be received.

A set of statistics associated with the target destination can be retrieved from a data store. A heuristically optimal route can be selected from the set of statistics through which the electronic document page or pages can be transmitted to the target destination. Subsequently, the electronic document page or pages can be transmitted to the target destination over the selected heuristically optimal route. Finally, statistics relating to the transmission can be collected and stored in the data store.

The heuristic routing method can include in addition the step of determining whether the electronic document page or pages can be transmitted over a data communications network in lieu of transmitting the electronic document page or pages over a PSTN. If the electronic document page or pages can be transmitted over the data communications network, an optimal route can be selected through the data communications network through which the electronic document page or pages can be transmitted to the target destination. Otherwise, if the electronic document page or pages cannot be transmitted over the data communications network, an optimal carrier can be selected in the PSTN with which the electronic document page or pages can be transmitted to the target destination.

Notably, the selecting step of the foregoing method can include the step of identifying from the set of statistics at least one carrier through which the electronic document page or pages is most likely to be transmitted successfully. It subsequently can be determined from among the at least one identified carrier, a carrier most suitably configured to successfully carry the electronic document page or pages at a most cost effective rate. Consequently, the determined carrier can be selected to carry the electronic document page or pages to the target destination.

To that end, the previously compiled statistics can include at least one carrier statistic selected from the group consisting of: call success per target destination per selected carrier, line quality per connection to target destination per selected carrier, and line performance per connection to target destination per selected carrier. Similarly, the previously compiled statistics further can include at least one IP network device related statistic selected from the group consisting of latency per IP device per target device, packet size per IP device per target device, dropped packets per IP device per target device, and quality of service (QoS) protocol per IP device per target device.

The present invention also can include a heuristic router. The heuristic router can include a broadcast fax transmitter configured to broadcast a fax formatted electronic document to selected target fax receivers specified according to a list of target fax receivers; a data store of statistical data associated with the target fax receivers; and, a heuristic routing processor coupled both to the data store and also to the broadcast fax transmitter. Notably, the heuristic routing processor can include a computer program for routing the formatted electronic document to each particular target fax receiver in the list over a corresponding heuristically optimal route determined from statistical data in the data store which is associated with the particular target fax receiver.

The heuristic routing system further can include a transmission monitor configured to monitor transmission conditions when transmitting the formatted electronic document to the particular target fax receiver. Moreover, the heuristic routing system can include statistical data capturing logic programmed to store in association with the particular target fax receiver into the data store, data points corresponding to the monitored transmission conditions. Importantly, the optimal route can include a route selected from the group consisting of an IP route having at least one IP network device, and a PSTN route having one or more PSTN carriers.

As such, the statistical data for the PSTN route can include at least one of call success per target destination per selected carrier, line quality per connection to target destination per selected carrier, and line performance per connection to target destination per selected carrier. By comparison, the statistical data for the IP network route can include at least one of IP network device related statistic selected from the group consisting of latency per IP device per target device, packet size per IP device per target device, dropped packets per IP device per target device, and a QoS protocol per IP device per target device.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is a heuristic routing system and method which can be applied not only to the transmission of a facsimile to a recipient facsimile device, but also which can be applied to the transmission of any electronic document, whether by PSTN, IP network or other such transport infrastructure. Unlike convention LCR methodologies, the heuristic methodology of the present invention considers least cost as only one of several factors in selecting an optimal route for a document transmission. Specifically, in the heuristic methodology of the present invention, the effective delivery of the document in the least amount of time at the least cost forms the foundation of the routing decision. For example, where the least cost route cannot provide for the most effective delivery, or will consume excessive connection time, the next least cost route can be chosen.

In accordance with the inventive arrangements, statistical data relating to an attempt to transmit an electronic document can be collected and retained for analysis. The statistical data can include, for instance, the success rate of establishing a connection for each call for each carrier. The statistical data further can include line quality data, such as signal to noise ratio (SNR) per call to a destination per carrier, speed per destination per carrier, and the like. Based upon the collected statistical data, particular carrier networks or network devices can be selected for particular attempts to transmit documents based not only upon cost, but upon the likelihood that the document can be transmitted successfully using the selected carrier network or network device. Moreover, the statistical data can be used to determine how many calls can be placed simultaneously to a target destination through a particular carrier.

Figure 1:
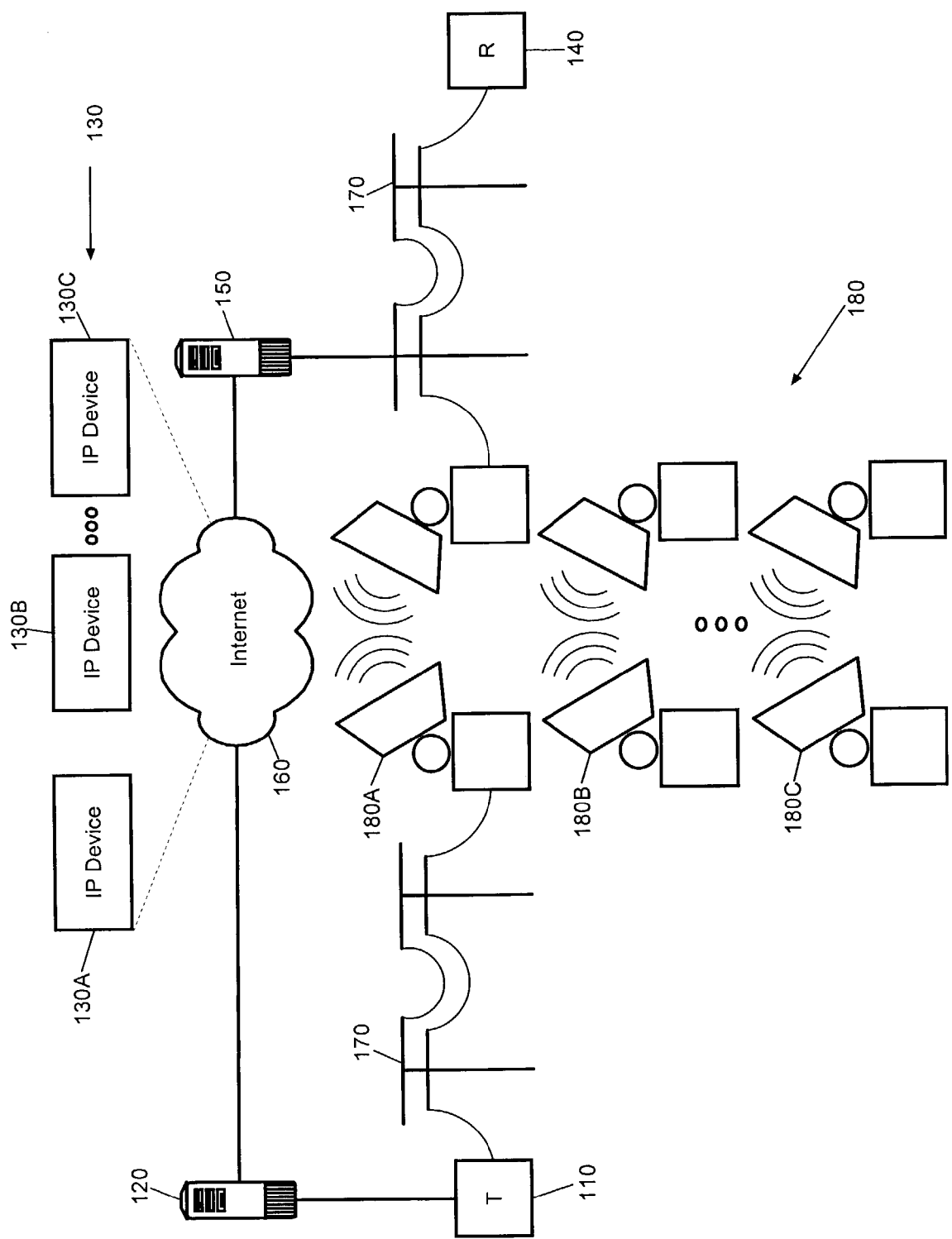
FIG. 1 is a schematic illustration of a heuristic routing system configured in accordance with the inventive arrangements.

FIG. 1 is a schematic illustration of a heuristic routing system configured in accordance with the inventive arrangements. The heuristic routing system can include a source document transmitter 110 and a target document receiver 140. In particular, the source document transmitter 110 can include a device through which an electronic document can be formatted for transmission to the target document receiver 140. Additionally, the source document transmitter 110 can route the formatted electronic document to the target document receiver 140 along an optimal path according to the heuristic routing method of the present invention. The target document receiver 140, by comparison, can be a device configured to receive and process electronically formatted documents over a communications network.

In accordance with one aspect of the present invention, the source document transmitter 110 and target document receiver 140 can be facsimile machines as will be recognized by one skilled in the art. Yet, the invention is not so limited and the source document transmitter 110 and target document receiver 140 also can be computing devices such as personal computers configured to process facsimile transmissions as is well-known in the art. Of course, the source document transmitter 110 and target document receiver 140 can be any combination of facsimile machines and computing devices as the case may be.

As in the case of conventional LCR systems, the heuristic routing system of FIG. 1 can process document transmissions over the PSTN 170, 180 or an IP network 160. In that regard, where a document is to be transmitted locally so as to incur minimal transmission costs, the document can be forwarded by the source document transmitter 110 over the local exchange carrier 170 using conventional fax telephony. The use of a long distance carrier 180 in that circumstance will not be required. Notwithstanding, where a document is to be transmitted remotely so as to incur long distance transmission costs, the document can be forwarded by the source document transmitter 110 over the IP network 160 to a fax server 150 positioned locally to the local exchange carrier 170 most closely associated with the target document receiver 140.

Importantly, where the heuristic routing method of the present invention determines that it would be cost effective to transmit the document from the source document transmitter 110 to the target document receiver 140 over the IP network 160, a particular route can be selected through the use of specified entries in a routing table so as to optimize the use of particular ones of IP devices 130A, 130B, 130C. Specifically, the particular route can be selected based upon previously collected statistics associated with the target document receiver 140. For instance, the statistics can include the latency experienced for a particular set of IP devices 130 for an associated target document receiver 140. The statistics further can include the pre-specified MTU settings of the set of IP devices 130, the number of dropped packets associated with any one portion of the set of IP devices 130, or the quality of service (QoS) protocol established within the set of IP devices 130.

In contrast, where the heuristic routing method determines that the document cannot be delivered to the target document receiver 140 over the IP network 160, a particular carrier 180A, 180B, 180C from among the long distance carriers 180 can be selected to carry the document transmission based upon previously collected statistics associated with the target document receiver 140. For example, those statistics can include the call success for the associated target document receiver 140 for each carrier 180A, 180B, 180C. Those statistics also can include the line quality for the associated target document receiver 140 for each carrier 180A, 180B, 180C. Finally, those statistics can include transmission performance for the associated target document receiver 140 for each carrier 180A, 180B, 180C.

In both cases, however, least cost is not the paramount consideration in selecting a route over which the document can be transmitted to the target document receiver 140. Rather, in accordance with the inventive arrangements, the route can be selected based upon a selection of heuristics relating to the route and the target document receiver 140 itself. In respect to the route, statistics in regard to the reliability and effectiveness of a particular carrier or IP device can be weighed against the cost of using the particular carrier 180A, 180B, 180C or one of the IP devices 130. In each case, the delivery of the document is to be considered more important than the cost of delivering the document. By comparison, in respect to the target document receiver 140, statistics can be evaluated such as whether a device exists at the termination point (a voice answer would indicate otherwise), the document format utilized by the target document receiver (formats resulting in small document sizes for quicker transmission times are preferred), internal reachability within an IP network, and the time ordinarily required to establish a communicative link.

Figure 2:
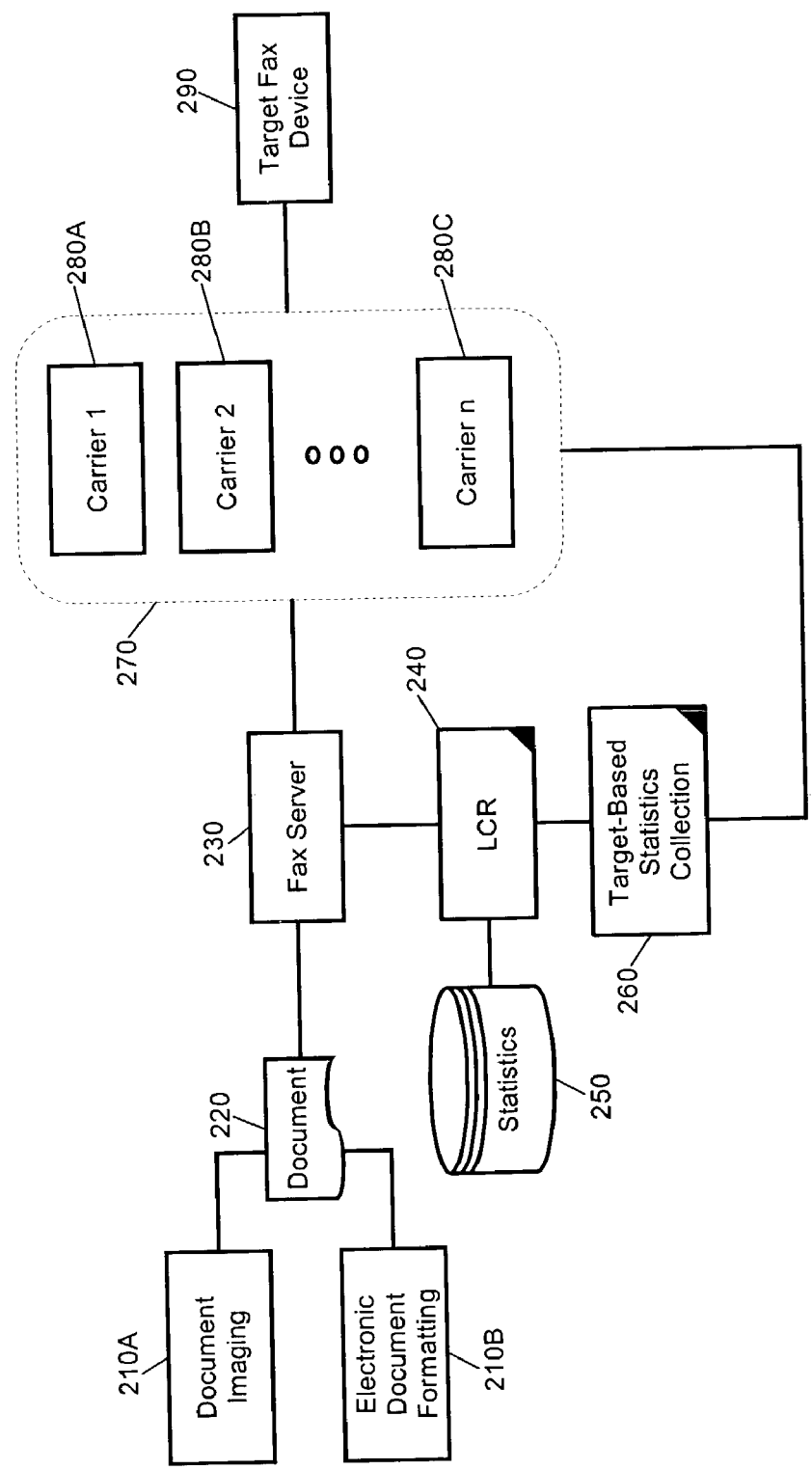
FIG. 2 is a block diagram of the heuristic routing system of FIG. 1.

FIG. 2 is a block diagram of the heuristic routing system of FIG. 1. The heuristic routing system illustrated in FIG. 2 has been illustrated in reference particularly to the transmission of a facsimile document 220 to a target fax device 290 from one of a document imaging device 210A such as a fax machine, or an electronic document formatting process 210B such as a portable document formatting system operating within the context of a computing device. Still, it will be important to recognize that the invention is not so limited to the application of the heuristic routing system and method of the present invention to fax devices and other such electronic document transmission systems are contemplated herein such as portable document formatting systems and multi-medium electronic document delivery systems.

In any event, a fax server 230 can be configured for operation with the heuristic routing process 240 of the present invention. To that end, upon receipt of the electronic document 220, the fax server can identify the target fax device 290. Based upon the identity of the target fax device 290, the fax server can apply the heuristic routing process 240 to determine an optimal route for transmitting the electronic document 220 to the target fax device 290. For instance, in the case where a PSTN 270 forms the underlying medium of transmission, a particular one of the carriers 280A, 280B, 280C can be selected to carry the transmission of the electronic document 220 based upon previously collected statistics 250 regarding previous attempts to transmit electronic documents to the target fax device 290 over the selected one of the carriers 280A, 280B, 280C.

Notably, during the course of transmitting the electronic document 220 to the target fax device 290 over the selected one of the carriers 280A, 280B, 280C, a target-based statistics collection process 260 can collect statistics regarding the transmission of the electronic document 220 to the target fax device 290 over the selected one of the carriers 280A, 280B, 280C. In that regard, the statistics which are collected can include by way of example, whether or not the call to the target fax device 290 could be completed successfully using the selected one of the carriers 280A, 280B, 280C, the line quality of the connection to the target fax device 290 using the selected one of the carriers 280A, 280B, 280C, and line performance of the connection to the target fax device 290 using the selected one of the carriers 280A, 280B, 280C.

It will be recognized by one skilled in the art that the foregoing exemplary collected statistics are not an exclusive representation of all possible statistics which could be collected in relation to an attempt to transmit an electronic document to a target fax device over a selected carrier. Rather, any collected statistic can suffice to the extent that a collected statistic can be used to establish a heuristic routing determination based upon both the likelihood of successfully transmitting the electronic document to the particularly specified target document receiver, and the efficiency in transmitting the electronic document to the particularly specified target document receiver. Moreover, where an IP network can be used in lieu of the PSTN for at least a portion of the transmission path between transmission source and transmission receiver, the collected statistics can relate more closely to the performance of an IP device such as a router or switch, and a preferred route can be established rather than or in supplement to a preferred carrier in the PSTN.

The collected statistic also can be used in preparation for transmitting an electronic document to a target receiver. Specifically, the document format processing capabilities of a target document receiver can be recorded. Based upon those recorded capabilities, documents to be transmitted to the target document receiver can be stored in the format most suitable for the target document receiver. In this way, a costly document format conversion process can be avoided at transmission time, as can the wasted storage of a document formatted in a manner ill-suited for the particular target document receiver.

Notably, it will be recognized by one skilled in the art that the application of the heuristic routing of the present invention not only can provide a cost-effective and efficient route over which a document can be transmitted to a target receiver, but also, in larger document broadcasting networks, device faults can be inferred from the heuristic routing decisions. Specifically, where the heuristic routing process determines that a particular device has proven unreliable and accordingly selects a different device through which to transmit a document, it can be inferred that the particular device may have experienced a fault. As the device will lie within the network, it would be a simple matter to physically inspect the integrity of the device. In this regard, a static analysis of the statistics further can reveal errant devices within the network.

Figure 3:
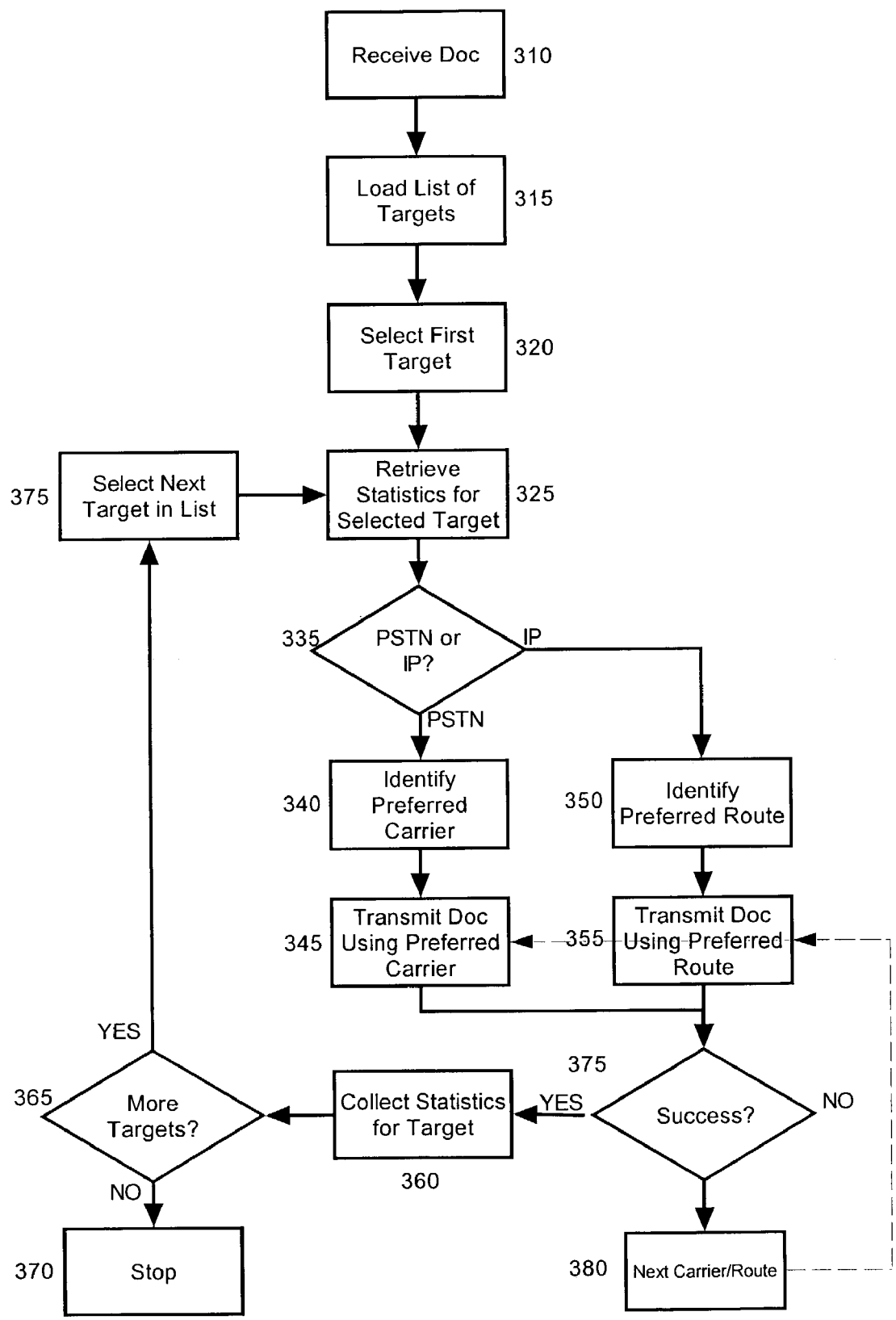
FIG. 3 is a flow chart illustrating a heuristic routing process for use in the heuristic routing system of FIG. 1.

FIG. 3 is a flow chart illustrating a heuristic routing process for use in the heuristic routing system of FIG. 1. In particular, in accordance with a preferred albeit non-exclusive aspect of the present invention, the heuristic routing process illustrated in FIG. 3 can be applied to a combination of PSTN and IP network based broadcast transmission. Specifically, beginning in block 310, a suitably formatted electronic document can be received in the broadcast transmission server. In block 315 the broadcast transmission server can load a list of targets specified to receive the electronic document. Subsequently, the heuristic routing method of the present invention can be applied in block 320 through 375 for each target included in the list of targets.

More particularly, in block 320, the first target in the list can be selected. In block 325, previously stored statistics for the selected target can be retrieved. In decision block 335, it can be determined whether the electronic document can be transmitted to the selected target by way of the IP network rather than the PSTN. While it is preferable to route the electronic document by way of the IP network rather than the PSTN to avoid incurring additional costs associated with the use of the PSTN, in many cases, the use of the PSTN cannot be avoided. Moreover, in accordance with the inventive arrangements, the successful delivery of the electronic document to the selected target will be prioritized over the most cost effective route to the target. Accordingly, where it is not likely that the electronic document can be transmitted successfully to the selected target by way of the IP network, the PSTN will be selected.

In any case, where the IP network has been selected, in block 350 a preferred route can be identified based upon the retrieved statistics. The retrieved statistics can include, for example, latency, established packet size, dropped packets and QoS protocol. Importantly, the statistics can be cumulative so that statistics for each of multiple transmissions of electronic documents to the selected target can be considered. Also, the cumulative statistics can be weighted so as to give preference to more recent transmission attempts. In any case, once the preferred route has been identified, in block 355 the electronic document can be transmitted accordingly through the application of a suitable entry in a routing table.

By comparison, where the PSTN network has been selected in decision block 335, in block 340 a preferred carrier can be identified based upon the retrieved statistics. The retrieved statistics can include, for example, call success per carrier, line quality per carrier, transmission speed of the modem in the target, the error correction level of the target, raw fax speed of the target, and line noise associated with the carrier for the target. Notably, where it is more likely that line noise will cause an excessive use of error correction processes in the target, the carrier will be disfavored. Similarly, where the error correction level of the target device will likely cause transmission delays based upon the quality of the line due to the processing overhead consumed by the target device, the carrier will be disfavored.

Regardless of whether the PSTN or IP route has been chosen, in decision block 375, it can be determined whether the transmission has been successful. Where the transmission has failed, in block 380 a next preferred carrier or route can be selected and in blocks 345 and 355, the document can be transmitted accordingly. Otherwise, in block 360, statistics can be collected for the transmission of the electronic document to the target device. In particular, it should be recognized by one skilled in the art that the collection of statistics should not imply that the previously collected statistics are automatically discarded in favor of the newly collected statistics. Rather, in a preferred aspect of the present invention, the newly collected statistics represent additional data points which, in combination with previously collected data points, can be used to probabilistically determine the likelihood that a particularly selected route or carrier can adequately carry the transmitted document to the target at an optimal cost.

In any case, in decision block 365, if more targets remain in the target list, in block 375 the next target in the list can be selected and the process can repeat in blocks 325 through 375. Otherwise, the heuristic routing process of the present invention can terminate in block 370. Notably, the heuristic routing method of the present invention can be realized in hardware, software, or a combination of hardware and software. An implementation of the heuristic routing method of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A heuristic routing method comprising the steps of:
   receiving a request to transmit an electronic document to a target destination;
   retrieving from a data store of previously compiled statistics, a set of statistics associated with in addition to least cost, one of a likelihood of successfully transmitting a document to said target destination and a time consumed in transmitting said document to said target destination;
   heuristically selecting from said set of statistics an optimal route through which said electronic document can be transmitted to said target destination;
   transmitting said electronic document to said target destination over said heuristically selected optimal route; and,
   collecting statistics relating to said transmission, and storing said collected statistics in said data store.

2. The heuristic routing method of claim 1, further comprising the steps of:
   determining whether said electronic document can be transmitted over a data communications network in lieu of transmitting said complete electronic document over a public switched telephone network (PSTN);
   if said electronic document can be transmitted over said data communications network, selecting an optimal route through said data communications network through which said electronic document can be transmitted to said target destination; and,
   if said electronic document cannot be transmitted over said data communications network, selecting an optimal carrier in said PSTN with which said electronic document can be transmitted to said target destination.

3. The heuristic routing method of claim 1, wherein said transmitting step comprises the steps of:
   determining whether said electronic document has been transmitted successfully; and, if said electronic document has not been transmitted successfully, heuristically selecting from said set of statistics an second optimal route through which said electronic document can be transmitted to said target destination, and transmitting said electronic document over said second optimal route.

4. The heuristic routing method of claim 1, wherein said selecting step comprises the steps of:
identifying from said set of statistics at least one carrier through which said electronic document is most likely to be transmitted successfully;
determining from among said at least one identified carrier a carrier most suitably configured to successfully carry said electronic document at a most cost effective rate; and,
selecting said determined carrier to carry said electronic document to said target destination.

5. The heuristic routing method of claim 4, wherein said previously compiled statistics further comprise at least one Internet protocol (IP) network device related statistic selected from the group consisting of latency per IP device per target device, packet size per IP device per target device, dropped packets per IP device per target device, and quality of service (QoS) protocol per IP device per target device.

6. The heuristic routing method of claim 4, wherein said previously compiled statistics further comprises target device statistics.

7. The heuristic routing method of claim 4, wherein said previously compiled statistics further comprises target device capabilities.

8. The heuristic routing method of claim 1, wherein said previously compiled statistics comprise at least one carrier statistic selected from the group consisting of:
call success per target destination per selected carrier,
line quality per connection to target destination per selected carrier, and
line performance per connection to target destination per selected carrier.

9. The heuristic routing method of claim 1, further comprising identifying a faulty device used to transmit said electronic document to said target destination based upon a review of said previously compiled statistics.

10. A heuristic routing system comprising:
a broadcast fax transmitter configured to broadcast a fax formatted electronic document to selected target fax receivers specified according to a list of target fax receivers;
a data store of statistical data associated with said target fax receivers and describing metrics associated with, in addition to least cost, one of a likelihood of successfully transmitting a document to said target destination and a time consumed in transmitting said document to; and,
a heuristic routing processor coupled both to said data store and also to said broadcast fax transmitter, said heuristic router having a computer program for routing said formatted electronic document to each particular target fax receiver in said list over a corresponding optimal route determined from statistical data in said data store which is associated with said particular target fax receiver.

11. The heuristic routing system of claim 10, further comprising:
a transmission monitor configured to monitor transmission conditions when transmitting said formatted electronic document to said particular target fax receiver; and,
statistical data capturing logic programmed to store in association with said particular target fax receiver into said data store, data points corresponding to said monitored transmission conditions.

12. The heuristic routing system of claim 10, wherein said optimal route comprises a route selected from the group consisting of an Internet protocol (IP) route comprising at least one IP network device, and a public switched telephone network (PSTN) route comprising a plurality of PSTN carriers.

13. The heuristic routing system of claim 12, wherein said statistical data for said PSTN route comprises at least one of call success per target destination per selected carrier, line quality per connection to target destination per selected carrier, and line performance per connection to target destination per selected carrier.

14. The heuristic routing system of claim 12, wherein said statistical data for said IP network route comprises at least one of IP network device related statistic selected from the group consisting of latency per IP device per target device, packet size per IP device per target device, dropped packets per IP device per target device, and quality of service (QoS) protocol per IP device per target device.

15. The machine readable storage of claim 14, wherein said previously compiled statistics further comprise at least one Internet protocol (IP) network device related statistic selected from the group consisting of latency per IP device per target device, packet size per IP device per target device, dropped packets per IP device per target device, and quality of service (QoS) protocol per IP device per target device.

16. A machine readable storage having stored thereon a computer program for heuristic routing of electronic documents, said computer program comprising a routine set of instructions which when executed by the machine cause the machine to perform the steps of:
receiving a request to transmit an electronic document to a target destination;
retrieving from a data store of previously compiled statistics, a set of statistics associated with in addition to least cost, one of a likelihood of successfully transmitting a document to said target destination and a time consumed in transmitting said document to said target destination;
heuristically selecting from said set of statistics an optimal route through which said electronic document can be transmitted to said target destination;
transmitting said electronic document to said target destination over said heuristically selected optimal route; and,
collecting statistics relating to said transmission, and storing said collected statistics in said data store.

17. The machine readable storage of claim 16, further comprising the steps of:
determining whether said electronic document can be transmitted over a data communications network in lieu of transmitting said electronic document over a public switched telephone network (PSTN);
if said electronic document can be transmitted over said data communications network, selecting an optimal route through said data communications network through which said electronic document can be transmitted to said target destination; and,
if said electronic document cannot be transmitted over said data communications network, selecting an optimal carrier in said PSTN with which said electronic document can be transmitted to said target destination.

18. The machine readable storage of claim 16, wherein said transmitting step comprises the steps of:

determining whether said electronic document has been transmitted successfully; and, if said electronic document has not been transmitted successfully, heuristically selecting from said set of statistics an second optimal route through which said electronic document can be transmitted to said target destination, and transmitting said electronic document over said second optimal route.

19. The machine readable storage of claim 16, wherein said selecting step comprises the steps of:

identifying from said set of statistics at least one carrier through which said electronic document is most likely to be transmitted successfully;

determining from among said at least one identified carrier a carrier most suitably configured to successfully carry said electronic document at a most cost effective rate; and, selecting said determined carrier to carry said electronic document to said target destination.

20. The machine readable storage of claim 16, wherein said previously compiled statistics comprise at least one carrier statistic selected from the group consisting of:

call success per target destination per selected carrier, line quality per connection to target destination per selected carrier, and line performance per connection to target destination per selected carrier.

21. The machine readable storage of claim 16, wherein said previously compiled statistics further comprises target device statistics.

22. The machine readable storage of claim 16, wherein said previously compiled statistics further comprises target device capabilities.

23. The machine readable storage of claim 16, further comprising the step of identifying a faulty device used to transmit said electronic document to said target destination based upon a review of said previously compiled statistics.

\* \* \* \* \*